(12) United States Patent
Nie et al.

(10) Patent No.: US 12,252,989 B1
(45) Date of Patent: Mar. 18, 2025

(54) INDUCED POLARIZATION METHOD AND SYSTEM MOUNTED ON WHILE DRILLING-TYPE DRILL RIG BASED ON LONG-LENGTH POWER SOURCE FOR WATER DETECTION IN TUNNELS

(71) Applicant: SHANDONG UNIVERSITY, Jinan (CN)

(72) Inventors: Lichao Nie, Jinan (CN); Zhaoyang Deng, Jinan (CN); Zhiqiang Li, Jinan (CN); Lei Han, Jinan (CN); Shixun Jia, Jinan (CN); Yuancheng Li, Jinan (CN); Pengyu Jing, Jinan (CN)

(73) Assignee: SHANDONG UNIVERSITY, Jinan (CN)

( * ) Notice: Subject to any disclaimer, the term of this patent is extended or adjusted under 35 U.S.C. 154(b) by 0 days.

(21) Appl. No.: 18/941,053

(22) Filed: Nov. 8, 2024

(30) Foreign Application Priority Data

Jun. 4, 2024 (CN) .......................... 202410711107.0

(51) Int. Cl.
*E21D 9/00* (2006.01)

(52) U.S. Cl.
CPC .................................. *E21D 9/003* (2013.01)

(58) Field of Classification Search
CPC ...................................................... E21D 9/003
See application file for complete search history.

(56) References Cited

U.S. PATENT DOCUMENTS

2015/0338549 A1* 11/2015 Li ........................... G01V 20/00
703/6

* cited by examiner

*Primary Examiner* — Alesa Allgood
(74) *Attorney, Agent, or Firm* — IPRO, PLLC; Na Xu

(57) ABSTRACT

The invention provides an induced polarization method and system mounted on a while drilling-type drill rig based on a long-length power source for water detection in tunnels, wherein the IP system comprises a long-length power source module for power supply while drilling, comprising a long-length power source and an electrode being a drill pipe of the while drilling-type drill rig; an array-type data collection module; and, a positioning and interpretation module, that may interpret and image data induced separately when a point power source is located near a drill bit at a current time obtained by differentiating an IP signal for water detection in tunnel at the current time from an IP signal for water detection in the tunnel at a previous time, to realize a dynamic identification of hazardous water sources in front of the tunnel face, and the detection while drilling or multi-detection while drilling.

7 Claims, 3 Drawing Sheets

INDUCED POLARIZATION METHOD AND SYSTEM MOUNTED ON WHILE DRILLING-TYPE DRILL RIG BASED ON LONG-LENGTH POWER SOURCE FOR WATER DETECTION IN TUNNELS

TECHNICAL FIELD

The present invention belongs to the technical field of induced polarization (IP) methods in tunnel borehole, and particularly relates to an IP method and system mounted on a while drilling-type drill rig based on a long-length power source for water detection in tunnels.

BACKGROUND OF THE INVENTION

The statements in this section only provide background technical information related to the present invention and do not necessarily constitute prior technology.

In advanced prediction of unfavorable geology for deep bury tunnels and sea crossing tunnels, as suffering from the action of high water pressure load, sub-meter water conducting channels such as dissolution fracture, karst pipeline and fracture zone are easy to induce large water inrush, and the chain action of multiple disasters presents exponential amplification effect, which is easy to induce disastrous consequences. However, the traditional advanced geological prediction technology of tunnel performs observations inside the cave and on the tunnel surface, which is restricted by narrow environment and strong interference, and its resolution cannot fully meet the engineering requirements of advanced fine prediction. In-Borehole IP detection electrode is closer to deep target body, which can realize both prediction and evaluation of geological anomaly body such as water-rich anomaly area in front of tunnel face, and is an effective means of fine water detection.

In an aspect of the IP method in tunnel borehole, the common method is to use the borehole on the tunnel face or side wall, and place the point electrode source in the borehole to excite the electrical signal, so as to find the appropriate observation method to detect the effective information of abnormal structure. The application of traditional IP method in tunnel borehole is seriously affected by the excitation intensity of point electrode source and drilling efficiency, while the interference of drilling environment such as metal casing cannot be ignored, so it cannot fully play the guiding role in tunnel safety construction in many aspects such as detection resolution, accuracy and depth.

SUMMARY OF THE INVENTION

In order to solve the technical problems of low efficiency of long boreholes and poor precision of detection results in the background, the present invention provides an IP method and system mounted on a while drilling-type drill rig based on a long-length power source for water detection in tunnels, which can realize the detection while drilling and multi-detection while drilling, greatly shorten a time of the in-borehole IP detection, monitor abnormal conditions in front of a tunnel in a wide range, and improve detection efficiency.

In order to achieve the above object, the present invention adopts the following technical solutions.

A first aspect of the present invention provides an IP system mounted on a while drilling-type drill rig based on a long-length power source for water detection in tunnels.

The IP system mounted on the while drilling-type drill rig based on the long-length power source for water detection in tunnels, comprising a long-length power source module for power supply while drilling, an array-type data collection module and a positioning and interpretation module; wherein, the long-length power source module for power supply while drilling comprises a long-length power source and an electrode; wherein, the electrode is a drill pipe of the while drilling-type drill rig; the long-length power source is defined to be formed by superposing finite point power sources in a period of IP detection in a tunnel performed by the drill pipe at different depths;

the array-type data collection module is arranged on a tunnel face of the tunnel in an array mode and is used for acquiring IP signals for water detection in the tunnel at different depths and transmitting the signals to the positioning and interpretation module; and the positioning and interpretation module, is configured to:

obtain data induced separately when a point power source is located near a drill bit at a current time, through differentiating an IP signal for water detection in the tunnel at the current time from an IP signal for water detection in the tunnel at a previous time; and interpret and image the data induced separately when the point power source is located near the drill bit, to realize a dynamic identification of hazardous water sources in front of the tunnel face.

According to an implementation mode, the positioning and interpretation module comprises an IP host and a positioning sub-module, wherein the position sub-module is mounted on the while drilling-type drill rig and is used for positioning the drill pipe and sending positioning information to the IP host; and, the IP host is used to interpret and image the received IP data.

The above technical solution has the advantages that: in this way, the detection while drilling and multi-detection while drilling of IP based on the long-length power source with different lengths can be realized, the time of in-borehole IP detection can be greatly shortened, abnormal conditions in front of a tunnel can be monitored in a wide range, detection distances and detection accuracy at different positions can be considered, and detection efficiency can be improved.

According to an implementation mode, the array-type data collection module comprises multiple groups of non-polarized electrodes and data receiving units, and evenly covers the tunnel surface.

The above technical solution has the advantage that: the IP data can be accurately acquired.

According to an implementation mode, the multiple groups of non-polarized electrodes are conductive rods disposed in saturated conductive solution.

The above technical solution has the advantages that: a polarization potential difference of the electrode is reduced to less than 1 millivolt, and the polarization potential difference of the measuring electrode itself is also reduced.

According to an implementation mode, the array-type data collection module is arranged on the tunnel face according to a set array sequence.

According to an implementation mode, the drill pipe is connected to the while drilling-type drill rig through a rotary joint.

According to an implementation mode, one end of the rotary joint connected with the drill pipe is able to rotate.

The above technical solution has the advantage that: a continuous power supply is provided for the drill pipe in the drilling process.

According to an implementation mode, another end of the rotary joint connected with the while drilling-type drill rig is fixed, and a silicon carbide connecting piece is connected therebetween.

The above technical solution has the advantages that: the silicon carbide material has high torsional strength, fine heat resistance, fine wear resistance and non-conductivity, so that an insulation figure can be realized on the premise of ensuring the strength of the drill pipe, and supplied current is effectively prevented from flowing to the while drilling-type drill rig.

A second aspect of the present invention provides an IP method for water detection in tunnels according to the IP system mounted on the while drilling-type drill rig based on the long-length power source for water detection in tunnels, the IP method comprises:

Step 1: drilling a drill pipe of a while drilling-type drill rig into surrounding rock of a tunnel, and performing a correspondingly IP detection in the tunnel according to a current drilling depth of the drill pipe;

Step 2: collecting, by an array-type data collection module arranged on a tunnel face of the tunnel, IP signals for water detection in the tunnel at different depths;

Step 3: differencing, by a positioning and interpretation module, an IP signal for water detection in the tunnel at a current time from an IP signal for water detection in the tunnel at a previous time, to obtain data induced separately when a point power source is located near the drill bit at the current time; and Step 4: drilling, by the drill pipe, into the surrounding rock again, repeating steps 1 to 3, to achieve an in-borehole IP detection with a long-length power supply based on the long-length power source with different lengths by controlling a position of the drill pipe entering the surrounding rock, so as to realize a detection while drilling, a multi-detection while drilling and a dynamic identification of hazardous water source in front of the tunnel face.

According to an implementation mode, the positioning and interpretation module interprets and images the data induced separately when the point power source located near the drill bit by using an IP forward and inversion algorithm.

Compared with the prior arts, the present invention has the advantages that:

(1) According to the present invention, a long-length electrode source induction mode is adopted, which shortens the distance between the detection field source and the target to a certain extent; and because the grounding resistance of the long-length power source is far less than that of the point power source, more current can be transmitted to the deep layer of the tunnel face, improving the signal intensity of the deep layer in front of the tunnel face to a certain extent and the signal-to-noise ratio; moreover, the whole drill pipe is used as a power supply electrode, which is more convenient than the traditional IP method of arranging measuring lines in the IP hole, and greatly saves the arrangement time of the observation apparatus.

(2) According to the present invention, the system is mounted on the while drilling-type drill rig, during the drilling process of the drill rig, information such as drill pipe position and propulsion speed is tracked in real-time, and then the IP detection based on long-length power source with different lengths is implemented; meanwhile, the positioning and interpretation module can perform real-time interpretation and imaging, realizing the detection while drilling and multi-detection while drilling using the IP detection based on long-length power source with different lengths, greatly shortening in-borehole IP detection time, and monitoring abnormal conditions in front of the tunnel in a wide range, thus improving detection efficiency.

(3) According to the present invention, the long-length power source for power supply is defined as the superposition of limited point power sources in the period of the IP detection of tunnel performed by the drill pipe at different depths; as the drill pipe continuously drills, the IP signal for water detection in the tunnel at the current time and the IP signal for water detection in the tunnel at the previous time are differentiated to obtain the data induced separately when the point power source at the current time is located near the drill bit, and then the data induced separately when the point power source is located near the drill bit are interpreted and imaged; and, with the drilling depth increasing continuously, the detection field source can approach the target body to the greatest extent, and the anomaly ratio of the detection signal is effectively improved.

Additional aspects of the present invention will be set forth in part in the description which follows, and in part will be obvious from the description, or may be learned by practice of the present invention.

BRIEF DESCRIPTION OF THE DRAWINGS

The accompanying drawings constituting a part of the present invention are used to provide a further understanding of the present invention. The exemplary examples of the present invention and descriptions thereof are used to explain the present invention, and do not constitute an improper limitation of the present invention.

Figure 1:
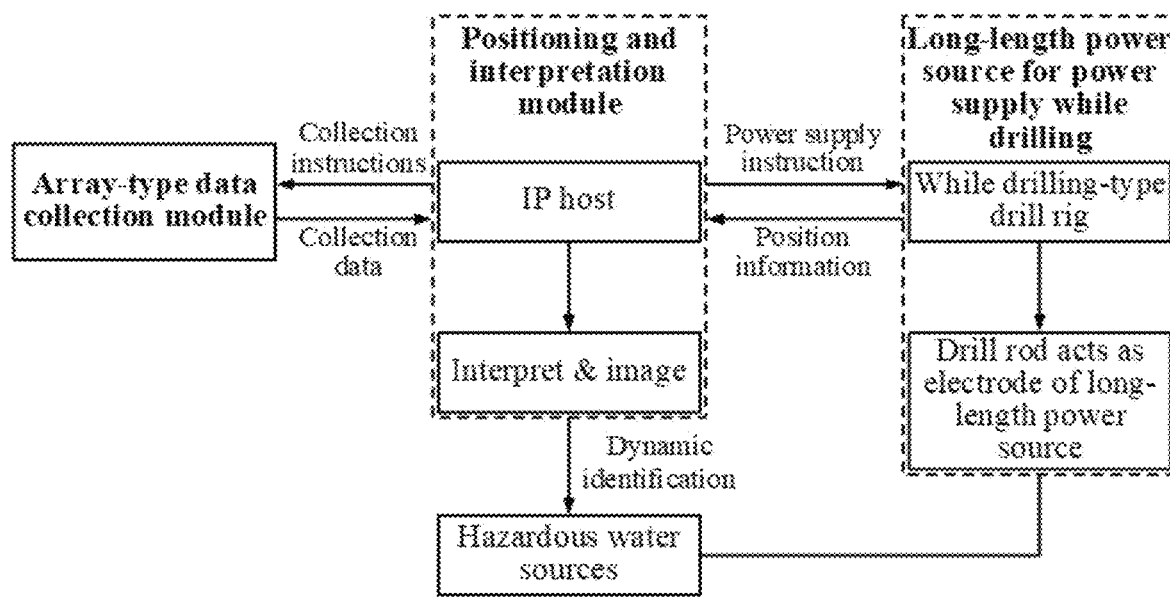
FIG. 1 is a block diagram of an IP system mounted on a while drilling-type drill rig based on a long-length power source for water detection in tunnels according to an embodiment of the present invention.

In figures: 1, array-type data collection module; 2, IP host; 3, while drilling-type drill rig; 4, rotary joint; 5, silicon carbide connecting piece; 6, drill pipe; 7, hazardous water source; 8, cable; 9, grounding electrode; 10, non-polarized electrode; 11, data receiving unit.

DETAILED DESCRIPTION OF THE INVENTION

The present invention will now be further described with reference to the accompanying drawings and examples.

It should be pointed out that the following detailed descriptions are all illustrative and are intended to provide further descriptions of the present invention. Unless otherwise specified, all technical and scientific terms used in the present invention have the same meanings as those usually understood by a person of ordinary skill in the art to which the present invention belongs.

It should be noted that the terms used herein are merely used for describing specific implementations, and are not intended to limit exemplary implementations of the present invention. As used herein, the singular form is also intended to include the plural form unless the context clearly dictates otherwise. In addition, it should further be understood that, terms "include" and/or "including" used in this specification indicate that there are features, steps, operations, systems, components, and/or combinations thereof.

In the aspect of in-borehole IP method of tunnel, conventional drill rig has large workload and takes long time for tunnel construction when drilling long holes; hole collapse phenomenon often occurs in soft rock in drilling holes, which has seriously effect on the arrangement of in-borehole IP survey lines of tunnel, and results to reduce the detection efficiency; moreover, the intensity of induction signal of traditional point electrode source is limited, the radiation energy of detecting physical field source decreases while the distance increasing, and the coupling between electric signal induced by the point electrode source and water anomaly in large depth is weak, so it has the disadvantage of small detection depth when forward detection is carried out in the tunnel.

Moreover, a good coupling between electrodes and environment should be realized when arranging the electrodes in drilling holes for detecting in the in-borehole IP method of tunnel, however, the metal casing borehole, grouting borehole and filling liquid borehole will change the electrical characteristics of surrounding rock near the electrodes, thus affecting the detection effect. For small water-bearing structures, the effective geophysical signals generated thereby are weak and easily submerged by noise, and the influence of the boreholes and other environmental factors on the detection data cannot be ignored.

In order to solve the technical problems of low efficiency and poor detection result accuracy in long-length boreholes, the present invention provides an IP method and system mounted on a while drilling-type drill rig based on a long-length power source for water detection in tunnels. The present invention will now be described in further detail with reference to specific embodiments.

Explanation of Terms

Non-polarizing electrode, commonly known as a polar tank, is a device used to receive electrical signals in electrical detection, and is a grounding electrode for measuring potential difference.

Figure 2:
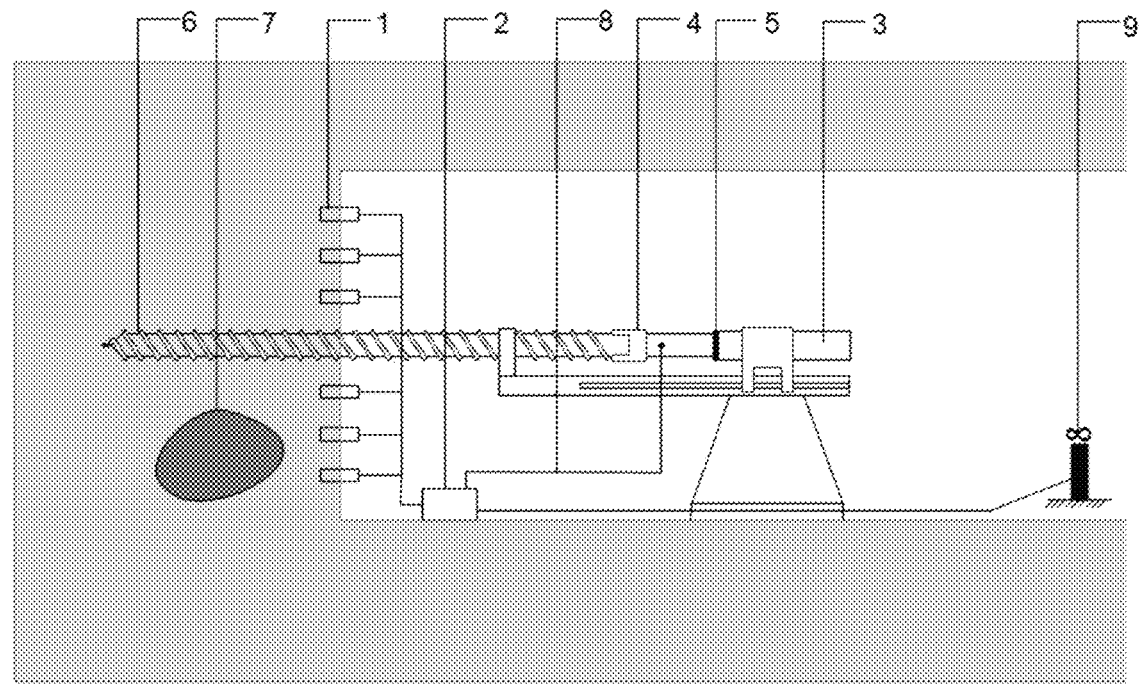
FIG. 2 is a layout diagram of the IP system mounted on the while drilling-type drill rig based on the long-length power source for water detection in tunnels according to an embodiment of the present invention.

FIG. 1 is a block diagram of an IP system mounted on a while drilling-type drill rig based on a long-length power source for water detection in tunnels according to an embodiment of the present invention. FIG. 2 is a layout diagram of the IP system mounted on the while drilling-type drill rig based on the long-length power source for water detection in tunnels according to an embodiment of the present invention.

According to FIGS. 1 and 2, the IP system mounted on the while drilling-type drill rig based on the long-length power source for water detection in tunnels of one embodiment of the present invention, including a long-length power source module for power supply while drilling, an array-type data collection module 1 and a positioning and interpretation module.

Specifically, the long-length power source module for power supply while drilling includes a long-length power source and an electrode, and the electrode is a drill pipe 6 of the while drilling-type drill rig. Wherein, the drill pipe 6 is used for drilling into surrounding rock and carrying out corresponding IP detection in a tunnel according to different drilling depths. The long-length power source is defined to be formed by superposing finite point power sources in a period of IP detection in the tunnel performed by the drill pipe at different depths.

Figure 4:
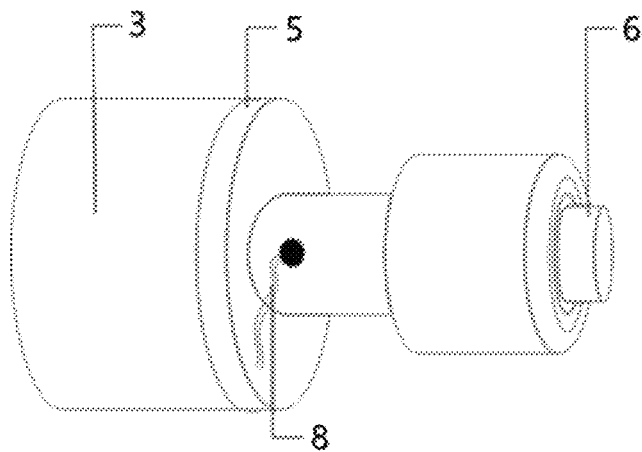
FIG. 4 is a schematic diagram of connection of a rotary joint according to an embodiment of the present invention.

In FIG. 4, the drill pipe 6 is connected to the while drilling-type drill rig 3 through a rotary joint 4; wherein, one end of the rotary joint 4 connected to the drill pipe 6 is able to rotate, and another end of the rotary joint 4 connected to the while drilling-type drill rig 3 is fixed, so as to continuously supply power to the drill pipe 6 during the drilling.

Wherein, the while drilling-type drill rig 3 is equipped with a long-length power source, and has full hydraulic drive, can meet the requirements of multi-aperture drilling, and has drill pipe positioning and follow-up speed control functions.

In the present embodiment, the while drilling-type drill rig 3 is connected to the rotary joint 4 through a silicon carbide connecting piece 5. The silicon carbide material has high torsional strength, fine heat resistance, fine wear resistance and non-conductivity, can realize insulation on the premise of ensuring the strength of drill pipes, and effectively prevents supplied current from flowing to the while drilling-type drill rig.

Figure 3:
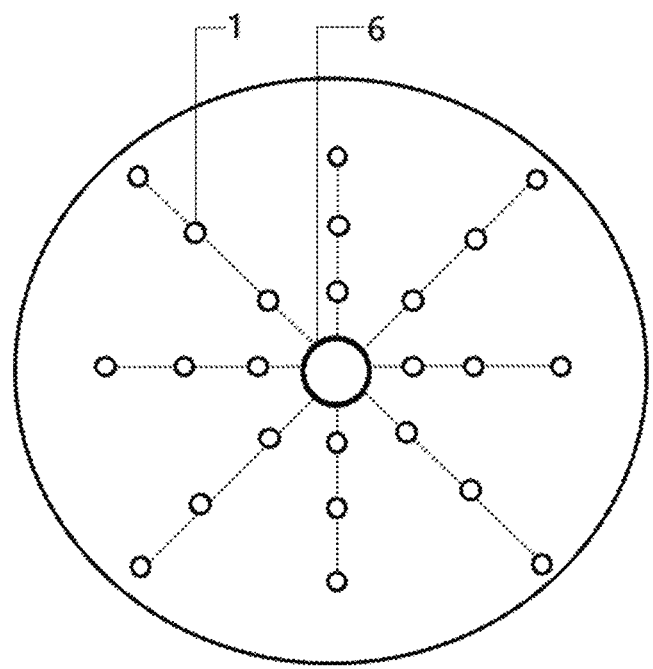
FIG. 3 is a schematic diagram of electrode arrangement on a tunnel surface according to an embodiment of the present invention.

As shown in FIG. 3, the array-type data collection module 1 is arranged on the tunnel face of the tunnel in an array mode, and is configured to acquire IP signals for water detection in the tunnel at different depths. For example, a plurality of sub-modules of the array-type data collection module 1 is arranged on the tunnel face according to a set array sequence.

Figure 5:
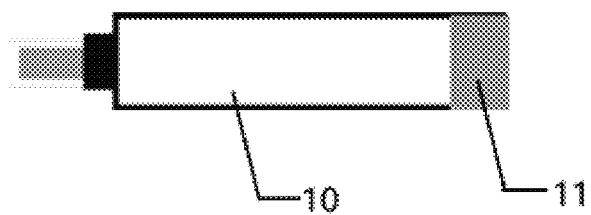
FIG. 5 is an internal structure diagram of an array-type data collection module according to an embodiment of the present invention.

Further, in order to accurately acquire the IP data, the array-type data collection module 1 is composed of multiple groups of non-polarized electrodes 10 and data receiving units 11 formed the plurality of the sub-modules, which are uniformly covered on the tunnel surface, as shown in FIG. 5. The array-type data collection module 1 performs an array measurement on the tunnel face to obtain the potential data of the measurement points.

The non-polarized electrodes 10 described here are ground electrodes 9 in arrangement of the IP system mounted on the while drilling-type drill rig based on the long-length power source for water detection in tunnels in FIG. 2.

In a specific implementation process, the non-polarized electrodes 10 are conductive rods disposed in a saturated conductive solution. For example, each the non-polarized electrode 10 is formed by placing a copper rod in a bisque porcelain jar containing a saturated copper sulfate solution, the copper rod being electrically conductive through ions of the copper sulfate solution permeated by the bisque porcelain jar. Such grounding conditions can reduce the polarization potential difference of the electrode to less than 1 mV, and also reduce the polarization potential difference of the measuring electrode itself.

It should be noted here that in other embodiments, the non-polarized electrodes can also be prepared by other existing preparation methods, which can be specifically selected by those skilled in the art according to actual conditions, and will not be described in detail here.

In the present embodiment, the positioning and interpretation module is configured to: obtain data induced separately when a point power source is located near a drill bit at a current time, through differentiating the IP signal for water detection in the tunnel at the current time from the IP signal for water detection in the tunnel at a previous time; and, interpret and image the data induced separately when the point power source is located near the drill bit, to realize a dynamic identification of hazardous water sources in front of the tunnel face.

In a specific implementation process, the positioning and interpretation module comprises an IP host 2 and a positioning sub-module, wherein the position sub-module is mounted on the while drilling-type drill rig 3 and is used for positioning the drill pipe and sending positioning information to the IP host 2. For example, after the detection schemes with different lengths of the electrode are determined, the detection is conducted when the drill pipe 6 is advanced for every d meters (wherein, d can be adjusted according to field conditions), and the positioning sub-module on the while drilling-type drill rig 3 can detect the position information of the drill pipe and feedback the position information to the IP host 2.

The IP host 2 is used to interpret and image the received IP data.

In one or more embodiments, a maximum output power of the IP host 2 may be up to 7.5 kW.

The IP host 2 is connected to the array-type data collection module 1 through the cable 8. When the drill pipe advances to the detection position, the IP host performs power supply to the array-type data collection module 1, data receiving, data interpretation and imaging in real-time, thereby realizing the detection while drilling and the multi-detection while drilling under long-length power source IP with different lengths, greatly shortening the time of in-borehole IP detection, performing large-range monitoring of abnormal conditions in front of the tunnel, considering the detection distance and detection accuracy of different positions, and improving detection efficiency.

The positioning and interpretation module analyzes the detection results, determines the low resistance area in front of the tunnel face, and finally completes the effective identification of the disaster water source 7 in front of the tunnel face.

In one or more embodiments, there is also provided an IP method for water detection in the tunnel by using the IP system mounted on the while drilling-type drill rig based on the long-length power source for water detection in tunnels as described above, comprising the following steps:

Step 1: drilling a drill pipe of a while drilling-type drill rig into surrounding rock of a tunnel, and performing a correspondingly IP detection in the tunnel according to a current drilling depth of the drill pipe.

Step 2: collecting, by an array-type data collection module arranged on a tunnel face of the tunnel, IP signals for water detection in the tunnel at different depths; wherein the array-type data collection module is arranged on the tunnel face according to a set array sequence.

Step 3: differencing, by a positioning and interpretation module, an IP signal for water detection in the tunnel at a current time from an IP signal for water detection in the tunnel at a previous time, to obtain data induced separately when a point power source is located near the drill bit at the current time.

In the specific implementation process, in the drilling process of the while drilling-type drill rig, the positioning sub-module on the while drilling-type drill rig tracks the drill pipe position and propulsion speed information in real-time, and the IP detection based on long-length power source is implemented every time through supplying power to the drill pipe through the rotary joint.

Step 4: drilling the drill pipe into the surrounding rock again, repeating steps 1 to 3, to achieve an in-borehole IP detection with a long power supply based on long-length power source with different lengths by controlling a position of the drill pipe entering the surrounding rock, so as to realize a detection while drilling, a multi-detection while drilling and a dynamic identification of hazardous water source in front of the tunnel face.

Specifically, the positioning and interpretation module may interpret and image the collected IP data using an IP forward and inversion algorithm.

An objective function of the inversion algorithm consists of general data item and model item. The final inversion result can be obtained by solving the minimum value of the objective function.

In the present embodiment, adopting the objective function φ(m) of a smooth constraint inversion algorithm, and an expression thereof is:

$$\varphi(m)=\varphi_d(m)+\lambda\varphi_m(m)=)\Delta d-J\Delta m)^T(\Delta d-J\Delta m)+\lambda\varphi_m(m)$$

wherein, m is model parameter; Δm is variation of model parameter; Δd is difference between observation data and model theoretical data; $\varphi_d$ is data fitting term; $\varphi_m$ is model constraint term; λ is Lagrangian operator, for adjusting weights of $\varphi_d$ and $\varphi_m$ to balance influence of both on result in inversion iteration process, which can improve stability and reliability of inversion effect; J is sensitivity matrix; T represents transposition of matrix.

In other embodiments, but not limited to, the finite element forward modeling method of three-dimensional geoelectric section can also be adopted. In order to improve the accuracy of solving three-dimensional electric field, the anomalous potential method is adopted:

$$Ku = -K'u_0; u = \frac{I\rho}{4\pi L}\int_0^l \frac{1}{x}dx = \frac{I\rho}{4\pi L}G; v = u + u_0;$$

wherein, K is the general class matrix; K' is the parameters related to resistivity; $u_0$ is the normal potential; u is the abnormal potential; I is the current intensity; ρ is the surrounding rock resistivity; L is the length of the line of the long-length power source; x is the distance between a certain section of the microelement of the long-length power source and the observation point; l is the longest distance between the long-length power source and the observation point; G is the system coefficient; and, v is the total potential.

It should be noted here that in other embodiments, other algorithms may also be adopted in the interpretation and imaging module to perform interpretation and imaging, which will not be described in detail here.

The IP method for water detection in the tunnel according to the IP system mounted on the while drilling-type drill rig based on the long-length power source for water detection in the tunnel proposed in the present embodiment, can be compatible with a conventional IP method, and is very simple and convenient to operate in actual detection; has the advantage of large detection depth when forward detection is performed in a tunnel, and ensures good detection effect; achieves real-time detection while drilling, which basically does not affect the construction progress; and, uses the IP forward and inversion algorithm to interpret and image the collected IP data, so that the intuition and accuracy of detection results are improved.

The foregoing descriptions are merely preferred embodiments of the present invention but are not intended to limit the present invention. A person skilled in art may make various alterations and variations to the present invention. Any modification, equivalent replacement, or improvement made within the spirit and principle of the present invention shall fall within the protection scope of the present invention.

The invention claimed is:

1. An induced polarization (IP) system mounted on a while drilling-type drill rig based on a long-length power source for water detection in tunnels, comprising a long-length power source module for power supply while drilling, an array-type data collection module and a positioning and interpretation module; wherein, the long-length power source module for power supply while drilling comprises a long-length power source and an electrode; wherein, the electrode is a drill pipe of the while drilling-type drill rig; the drill pipe is connected to the while drilling-type drill rig through a rotary joint; one end of the rotary joint connected to the drill pipe is able to rotate, another end of the rotary joint connected to the while drilling-type drill rig is fixed, and a silicon carbide connecting piece is connected therebetween; and, the long-length power source is defined to be formed by superposing finite point power sources in a period of IP detection in a tunnel performed by the drill pipe at different depths;

the array-type data collection module is arranged on a tunnel face of the tunnel in an array mode and is used for acquiring IP signals for water detection in the tunnel at different depths and transmitting the signals to the positioning and interpretation module; and the positioning and interpretation module, is configured to:

obtain data induced separately when a point power source is located near a drill bit at a current time, through differentiating an IP signal for water detection in the tunnel at the current time from an IP signal for water detection in the tunnel at a previous time; and interpret and image the data induced separately when the point power source is located near the drill bit, to realize a dynamic identification of hazardous water sources in front of the tunnel face.

2. The IP system mounted on the while drilling-type drill rig based on the long-length power source for water detection in tunnels according to claim 1, wherein the positioning and interpretation module comprises an IP host and a positioning sub-module, wherein the position sub-module is mounted on the while drilling-type drill rig and is used for positioning the drill pipe and sending positioning information to the IP host; and, the IP host is used to interpret and image the received IP data.

3. The IP system mounted on the while drilling-type drill rig based on the long-length power source for water detection in tunnels according to claim 1, wherein the array-type data collection module comprises multiple groups of non-polarized electrodes and data receiving units, and evenly covers the tunnel surface.

4. The IP system mounted on the while drilling-type drill rig based on the long-length power source for water detection in tunnels according to claim 3, wherein the multiple groups of non-polarized electrodes are conductive rods disposed in saturated conductive solution.

5. The IP system mounted on the while drilling-type drill rig based on the long-length power source for water detection in tunnels according to claim 1, wherein the array-type data collection module is arranged on the tunnel face according to a set array sequence.

6. An IP method for water detection in tunnels, using the IP system mounted on the while drilling-type drill rig based on the long-length power source for water detection in tunnels according to claim 1, wherein the IP method comprises:

step 1: drilling a drill pipe of a while drilling-type drill rig into surrounding rock of a tunnel, and performing a correspondingly IP detection in the tunnel according to a current drilling depth of the drill pipe;

step 2: collecting, by an array-type data collection module arranged on a tunnel face of the tunnel, IP signals for water detection in the tunnel at different depths;

step 3: differencing, by a positioning and interpretation module, an IP signal for water detection in the tunnel at a current time from an IP signal for water detection in the tunnel at a previous time, to obtain data induced separately when a point power source is located near the drill bit at the current time; and step 4: drilling, by the drill pipe, into the surrounding rock again, repeating steps 1 to 3, to realize long power supply in-borehole IP detection based on long-length power source with different lengths by controlling a position of the drill pipe entering the surrounding rock, so as to realize a detection while drilling, a multi-detection while drilling and a dynamic identification of hazardous water source in front of the tunnel face.

7. The water detection method according to claim 6, wherein the positioning and interpretation module is configured to interpret and image the data induced separately when the point power source located near the drill bit by using an IP forward and inversion algorithm.

* * * * *